(12) United States Patent
Sandrasekaran et al.

(10) Patent No.: US 12,109,842 B2
(45) Date of Patent: Oct. 8, 2024

(54) HUB LOCK NUT ASSEMBLY

(71) Applicant: Volvo Truck Corporation, Gothenburg (SE)

(72) Inventors: Ramachandran Sandrasekaran, Karnataka (IN); Kent Augustsson, Bollebygd (SE); Tobias Andersson, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 346 days.

(21) Appl. No.: 17/605,132

(22) PCT Filed: Apr. 29, 2019

(86) PCT No.: PCT/EP2019/060963
§ 371 (c)(1),
(2) Date: Oct. 20, 2021

(87) PCT Pub. No.: WO2020/221428
PCT Pub. Date: Nov. 5, 2020

(65) Prior Publication Data
US 2022/0203762 A1    Jun. 30, 2022

(51) Int. Cl.
*B60B 27/06*    (2006.01)
*B60B 35/14*    (2006.01)
(Continued)

(52) U.S. Cl.
CPC .......... *B60B 27/065* (2013.01); *F16B 39/284* (2013.01); *B60B 27/02* (2013.01); *B60B 35/02* (2013.01); *B60B 35/12* (2013.01)

(58) Field of Classification Search
CPC ....... B60B 27/065; B60B 27/02; B60B 35/02; B60B 35/12; B60B 35/14; F16B 39/24;
(Continued)

(56) References Cited

U.S. PATENT DOCUMENTS 168,597 A    10/1875    Atwood
915,830 A     3/1909    Craven
(Continued)

FOREIGN PATENT DOCUMENTS

BE    637228       12/1963
CH    476223 A    7/1969
(Continued)

OTHER PUBLICATIONS

First Office Action for Chinese Patent Application No. 201980095799. 8, mailed Feb. 11, 2023, 11 pages.
(Continued)

*Primary Examiner* — William D Hutton, Jr.
*Assistant Examiner* — Carl J Carlson
(74) *Attorney, Agent, or Firm* — Withrow & Terranova, PLLC (57) ABSTRACT

A hub lock nut assembly for retaining a vehicle wheel hub in position. The hub lock nut assembly comprising a hub lock nut and a mating component with which the hub lock nut is arranged to be mated in a mated position. The hub lock nut comprises a circumferential inner wall defining a central hole, the inner wall having a threaded portion. One of the hub lock nut or the mating component comprises at least one resilient portion adapted to be movable in a radial direction outwardly of the central hole when subjected to an external force provided by the other of the mating component or the hub lock nut. The at least one resilient portion having an engagement area for receiving said external force, wherein the engagement area is located radially outwardly of the threaded portion.

10 Claims, 6 Drawing Sheets

(51) Int. Cl.
*F16B 39/284* (2006.01)
*F16B 39/32* (2006.01)
*B60B 27/02* (2006.01)
*B60B 35/02* (2006.01)
*B60B 35/12* (2006.01)

(58) Field of Classification Search
CPC .......... F16B 39/26; F16B 39/32; F16B 39/34; F16B 39/284
USPC ......... 411/10, 161, 280, 294, 301, 313, 324, 411/326, 327, 329, 337, 428, 432, 508, 411/509, 510
See application file for complete search history.

(56) References Cited

U.S. PATENT DOCUMENTS

| | | | |
|---|---|---|---|
| 1,885,459 | A | 11/1932 | McDonnell |
| 2,286,895 | A | 6/1942 | Carlson |
| 4,144,755 | A | 3/1979 | Palloch |
| 4,431,353 | A | 2/1984 | Capuano |
| 4,616,856 | A * | 10/1986 | Kowalyshen ......... F16B 21/088 285/92 |
| 4,790,703 | A | 12/1988 | Wing |
| 6,095,733 | A | 8/2000 | Busby et al. |
| 8,967,932 | B2 | 3/2015 | Dionne |
| 10,323,679 | B2 | 6/2019 | Limatoc |
| 2004/0096289 | A1 | 5/2004 | Bydalek et al. |
| 2005/0220567 | A1 | 10/2005 | Winker |
| 2009/0301269 | A1 | 12/2009 | Wedge |
| 2013/0022782 | A1 | 1/2013 | Babej |
| 2016/0305465 | A1 | 10/2016 | Hess et al. |
| 2017/0234358 | A1 | 8/2017 | Bielecki et al. |
| 2018/0015781 | A1 * | 1/2018 | Falsetti ................. B60B 27/065 |

FOREIGN PATENT DOCUMENTS

| | | | | |
|---|---|---|---|---|
| CN | 1457401 | A | 11/2003 | |
| CN | 101999052 | A | 3/2011 | |
| CN | 102245914 | A | 11/2011 | |
| CN | 102272465 | A | 12/2011 | |
| CN | 103244539 | A | 8/2013 | |
| CN | 204327712 | U | 5/2015 | |
| CN | 205331183 | U | 6/2016 | |
| CN | 105829739 | A | 8/2016 | |
| CN | 107100923 | A | 8/2017 | |
| DE | 102012025165 | A1 * | 6/2014 | ............. F16B 39/32 |
| DE | 102013016714 | A1 | 4/2015 | |
| EP | 1092098 | A1 | 4/2001 | |
| EP | 1577571 | A1 | 9/2005 | |
| EP | 2256371 | A1 | 12/2010 | |
| FI | 20060070 | A | 7/2007 | |
| FR | 2450972 | A1 | 10/1980 | |
| FR | 2729190 | A1 | 7/1996 | |
| GB | 2192249 | A | 1/1988 | |
| GB | 2508620 | A | 6/2014 | |
| JP | H0610935 | A | 1/1994 | |
| JP | 3213541 | U | 11/2017 | |
| SE | 48583 | C1 | 1/1918 | |
| TW | 200900598 | A | 1/2009 | |
| WO | 2016035900 | A1 | 3/2016 | |
| WO | 2020221429 | A1 | 11/2020 | |

OTHER PUBLICATIONS

Notification to Grant for Chinese Patent Application No. 201980095799.8, mailed Jul. 1, 2023, 6 pages.
Intention to Grant for European Patent Application No. 19724748.9, mailed Oct. 17, 2023, 28 pages.
First Office Action for Chinese Patent Application No. 201980095807.9, mailed Aug. 29, 2023, 22 pages.
Examination Report for European Patent Application No. 19723696.1, mailed Sep. 1, 2023, 5 pages.
International Search Report and Written Opinion for International Patent Application No. PCT/EP2019/060963, mailed Jan. 22, 2020, 14 pages.
Second Written Opinion for International Patent Application No. PCT/EP2019/060963, mailed Jul. 3, 2020, 7 pages.
International Preliminary Report on Patentability for International Patent Application No. PCT/EP2019/060963, mailed Feb. 4, 2021, 24 pages.
International Search Report and Written Opinion for International Patent Application No. PCT/EP2019/060964, mailed Jan. 21, 2020, 14 pages.
Non-Final Office Action for U.S. Appl. No. 17/605,137, mailed Apr. 25, 2024, 6 pages.
Second Office Action for Chinese Patent Application No. 201980095807.9, mailed Mar. 2, 2024, 16 pages.
Decision of Rejection for Chinese Patent Application No. 201980095807.9, mailed May 16, 2024, 14 pages.

* cited by examiner

HUB LOCK NUT ASSEMBLY

This application is a 35 USC 371 national phase filing of International Application No. PCT/EP2019/060963, filed Apr. 29, 2019, the disclosure of which is incorporated herein by reference in its entirety.

TECHNICAL FIELD

The present disclosure relates to hub lock nut assemblies, hub lock nuts, spindles and safety washers for holding a wheel hub in position.

The invention can be applied in heavy duty vehicles, such as trucks, buses and construction equipment.

BACKGROUND

A wheel hub assembly, also sometimes referred to as a hub assembly, wheel hub unit or wheel hub bearing, is an automotive part used in many vehicle types such as trucks and semi-trailers. A wheel is attached to the wheel hub assembly, often by bolts. A roller bearing between the axle hub and axle shaft ensures easy rotation of the wheels.

The wheel hub assembly comprises a hub lock nut, which is a safety component that retains the wheel end in its position. It is important that the hub lock nut is properly tightened such that the wheel does not detach from the wheel hub assembly. The hub lock nut must also provide a prevailing torque to prevent loosening of the hub lock nut which holds the wheel hub in position.

GB 2508620 A discloses a locknut assembly comprising a lock nut configured to be mated with a compression washer in a mated position.

EP 1092098 A1, U.S. Pat. No. 4,616,856 A, EP 2256371 A1, and U.S. 2005/220567 A1 disclose various retention arrangements. More specifically, EP 1092098 A1 describe a locking system for a nut and bolt assembly where a boss is deformed into a compressive engagement with the bolt threads, which provides a prevailing torque. U.S. Pat. No. 4,616,856 A, EP 2256371 A1, and U.S. 2005/220567 A1 show other types of locking arrangements.

During manufacturing and assembly of the wheel hub, it is important that the hub lock nut threads are not damaged. Also, an efficient assembly process is preferred.

There is a need for improved hub lock nut assemblies which are robust and can be efficiently assembled.

SUMMARY

It is an object of the present disclosure to provide improved hub lock nut assemblies.

This object is obtained by a hub lock nut assembly for retaining a vehicle wheel hub in position. The hub lock nut assembly comprises a hub lock nut and a mating component with which the hub lock nut is arranged to be mated in a mated position. The hub lock nut comprises a circumferential inner wall defining a central hole. This inner wall has a threaded portion. Notably, one of the hub lock nut or the mating component comprises at least one resilient portion adapted to be movable in a radial direction R outwardly from the central hole when subjected to an external force F provided by the other of the mating component or the hub lock nut. The at least one resilient portion has an engagement area for receiving said external force F. This engagement area is located radially outwardly of the threaded portion in the mated position.

The prevailing function is here provided by the resilient portions and is therefore not directly associated with the threads on the hub lock nut. This way a more robust solution for generating prevailing torque is provided compared to solutions which use the threads in some way for providing the prevailing torque. Since the threads are not part of the prevailing torque function, thread tolerances may be relaxed in some cases, which is an advantage.

Also, the proposed design does not require as careful assembly of the vehicle wheel hub compared to when the prevailing torque function is based on the threads of the hub lock nut, thus saving time and providing for a more efficient assembly process.

According to aspects, the at least one resilient portion is in the form of a snap collar portion located radially of the threaded portion and projecting axially (A) away from the threaded portion. The at least one resilient portion is adapted to flex in the radial direction R outwardly from the central hole when subjected to the force.

The snap collar portions may be integrally formed with, e.g., the hub lock nut in hot-formed steel, which is an advantage. The number of snap collar portions and the dimensions of the snap collar portions can easily be designed to obtain different prevailing torques, which is an advantage. The snap collar portions can be flexed a number of times without losing their resilience property, which is an advantage in that a re-usability property is provided.

According to aspects, the mating component comprises a protrusion extending radially outwards from the mating component and configured to subject the resilient portion to the external force F in the mated position. The protrusion offers a cost-effective way to provide the force F in the mated position, which is an advantage. The resilient portions and the protrusion may be engaged and disengaged a number of times while still providing the prevailing torque. This is an advantage in that the wheel hub may be assembled and disassembled a number of times using the same hub lock nut assembly.

According to aspects, the central hole is further defined by a circumferential non-threaded portion. A ledge extends radially outwardly from the threaded portion to the non-threaded portion. The resilient portion is connected to said ledge and projects axially away from the ledge. Thus, the resilient portion is separated from the threads of the hub lock nut, which is an advantage.

According to aspects, a spindle, knuckle, or wheel axle portion constitutes the mating component. Providing a spindle, knuckle, or wheel axle portion with, e.g., a protrusion or bump to engage the resilient portion or portions on the hub lock nut offers an efficient way to provide a robust prevailing torque function.

According to aspects, the hub lock nut comprises a flat annular end surface facing in the axial direction. The resilient portion is located at the radial outer periphery of the annular end surface and the resilient portion projects in the axial direction away from the annular end surface. Again, advantageously, the resilient portion is separated from the threads of the hub lock nut. Also, by providing the resilient portions on the flat annular end surface, a safety washer may constitute the mating component. This way a spindle without the protrusion can be used, which is an advantage since existing spindles can be used without modification.

The techniques for providing prevailing torque presented herein are preferably applied with the resilient portion or portions arranged on the hub lock nut. However, the resilient portions may also be provided on the mating component, such as on the safety washer. In other words, according to aspects, the mating component comprises the at least one resilient portion adapted to be movable when subjected to an external force provided by the hub lock nut. According to one such aspect, the resilient portion is arranged on a safety washer arranged to mate with a hub lock nut comprising an annular protrusion configured to engage the resilient portion on the safety washer.

According to aspects, the external force F is configured to provide a prevailing torque of the hub lock nut assembly in dependence of the hub lock nut dimension, wherein the prevailing torque varies between 50 Nm and 230 Nm. Thus, advantageously, the techniques presented herein is adaptable to different dimensions of hub lock nuts, which is an advantage. An assortment of different hub lock nuts may be kept, and a suitable nut selected according to prevailing torque specifications.

According to aspects, the resilient portion comprises a distal protrusion extending radially inwards towards the center of the central hole and configured to releasably hold the mating component when in the mated position. Thus, a stronger prevailing torque may be provided if needed, which is an advantage.

There are also disclosed herein hub lock nuts, safety washers, spindles, wheel hubs, and vehicles associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1:
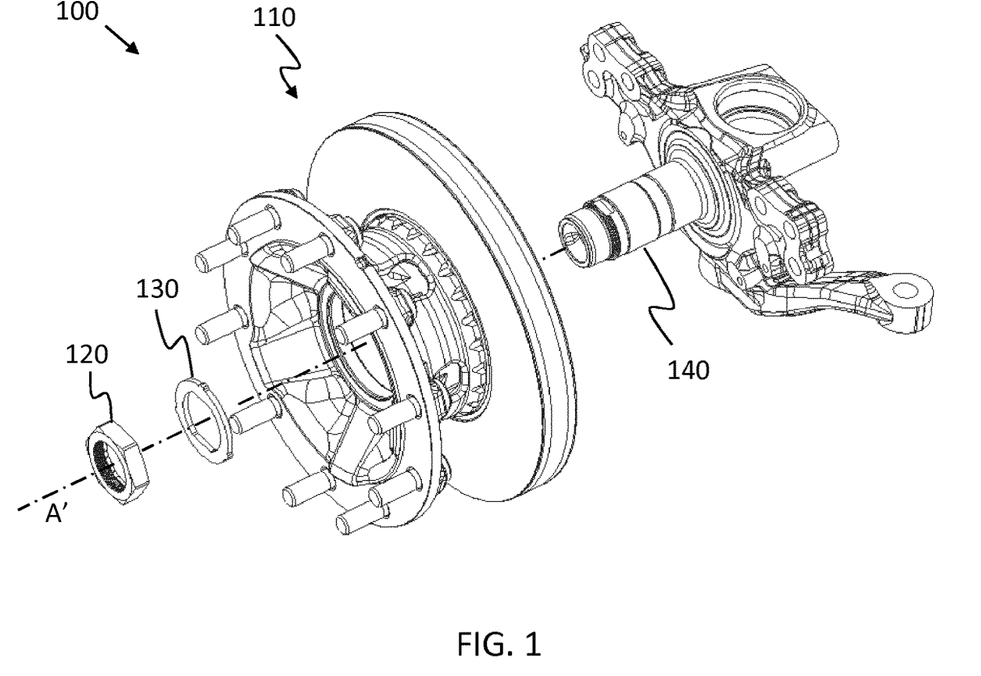
FIG. 1 schematically illustrates a wheel hub assembly.
Figure 10:
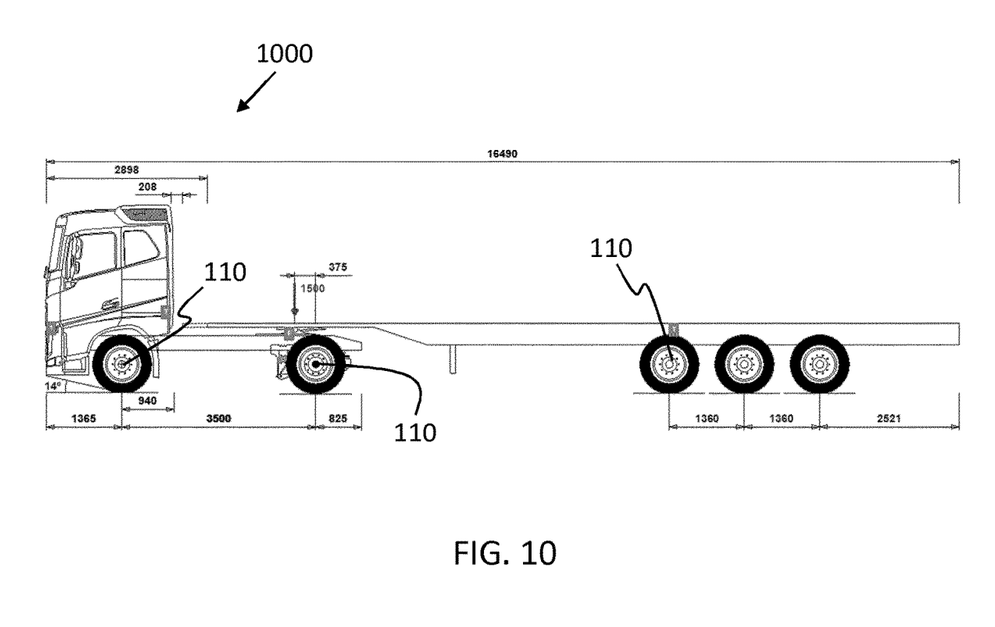
FIG. 10 illustrates a vehicle with wheel hubs.

FIG. 1 shows a wheel hub 110 for a vehicle such as the semi-trailer 1000 illustrated in FIG. 10. It is appreciated that the wheel hubs, components, and assemblies are applicable in a wide variety of different vehicle types.

A hub lock nut 120 is used to secure the vehicle wheel hub 110 to the spindle 140. Often, a safety washer 130 is arranged between the hub lock nut 120 and the wheel hub 110. It is desired to lock the wheel hub in position by using a hub lock nut assembly configured to provide a prevailing torque according to some given specification. Wheel hubs such as the wheel hub 110 schematically illustrated in FIG. 1 are known in general and will therefore not be discussed in detail here.

FIG. 1 shows a center axis A' of the wheel hub. The center axis A' extends in an axial direction. A direction orthogonal to the axial direction is herein referred to as a radial direction.

The present disclosure relates to a hub lock assembly adapted to provide a required prevailing torque. Prevailing torque differentiates a locknut from a free spinning nut based on a value of how much torque is required during installation before clamp loading. For example, on a nylon-insert nut, it is the torque needed to overcome the resistance of the nylon dragging across the mating thread. This torque value is usually not very high relative to final installation torque. Tolerance ranges for torque are specified in some standards such as ISO, DIN, IFI, ASME, SAE, AN-, MS-, NAS-NASM-.

Instead of using the thread on the hub lock nut 120 to provide prevailing torque, the present technique comprises using a hub lock nut with inbuilt resilient portions, such as one or more elastic collars or snap lock portions, which at an angle are arranged to climb against a bump feature on a mating component such as a safety washer or spindle, so the resilient portion can deflect/snap in & create prevailing torque.

Figure 2A:
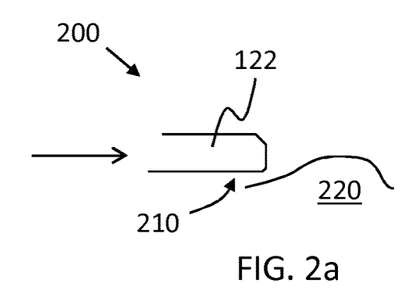
FIGS. 2a,2b illustrate an example resilient member engaging a protrusion.
Figure 2B:
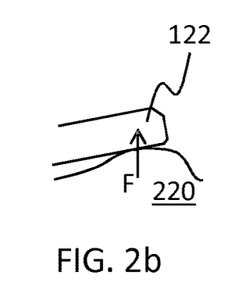

FIGS. 2a and 2b schematically illustrate the basic concept for generating prevailing torque disclosed herein. A resilient portion 122, here shown as a tongue-shaped element has an engagement area 210 which engages a protrusion 220 on the mating component. As the resilient portion climbs against the protrusion, a force F is exerted. This force F provides the prevailing torque, i.e., due to the force F, friction between the resilient portion 122 and the protrusion 220 increases.

Figure 3A:
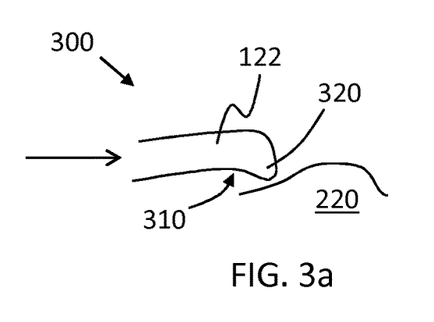
FIGS. 3a,3b illustrate another example resilient member engaging a protrusion.
Figure 3B:
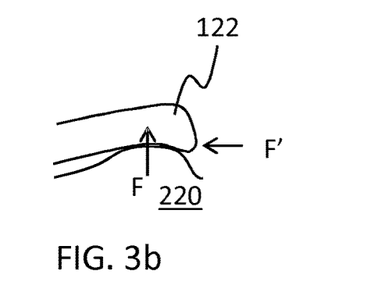

FIGS. 3a and 3b illustrate a similar concept where additional prevailing torque is generated compared to the example shown in FIGS. 2a and 2b. Here the resilient portion 122 also comprises a distal protrusion 320 extending towards the protrusion 220. This distal protrusion then releasably holds the protrusion when the resilient portion and the protrusion are mated by exerting another holding force F'. There is also an engagement area 310 with a similar function to the engagement area 210 in FIGS. 2a and 2b.

The resilient portions may be arranged either on the hub lock nut 120 or on the mating component 130, 140. For example, a safety washer may be adapted for mating with a hub lock nut 120 in a mated position to retain a vehicle wheel hub 110 in position This safety washer may comprise at least one resilient portion adapted to be movable when subjected to an external force F provided by a hub lock nut 120 with which the safety washer is arranged to be mated in a mated position. The at least one resilient portion has an engagement area 210, 310 for receiving said external force F, wherein the engagement area 210, 310 is located radially outwardly R of the safety washer. However, it is preferred to arrange the resilient portions on the hub lock nut 120.

Figure 4:
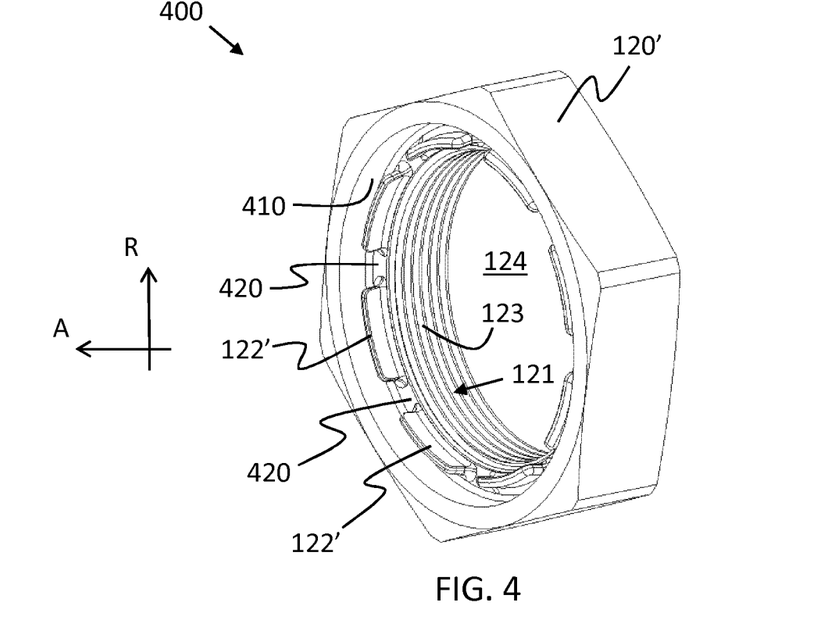
FIG. 4 shows an example hub lock nut.
Figure 5:
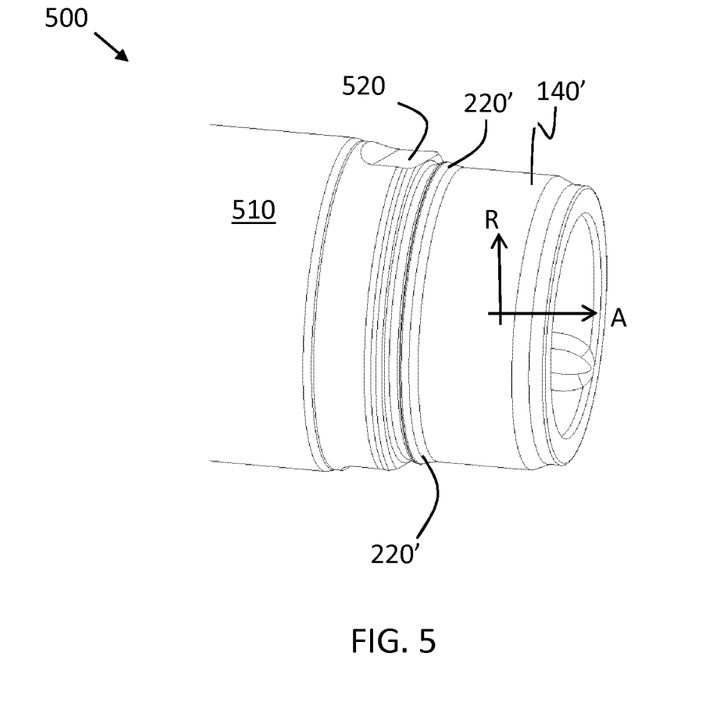
FIG. 5 illustrates an example spindle.
Figure 6A:
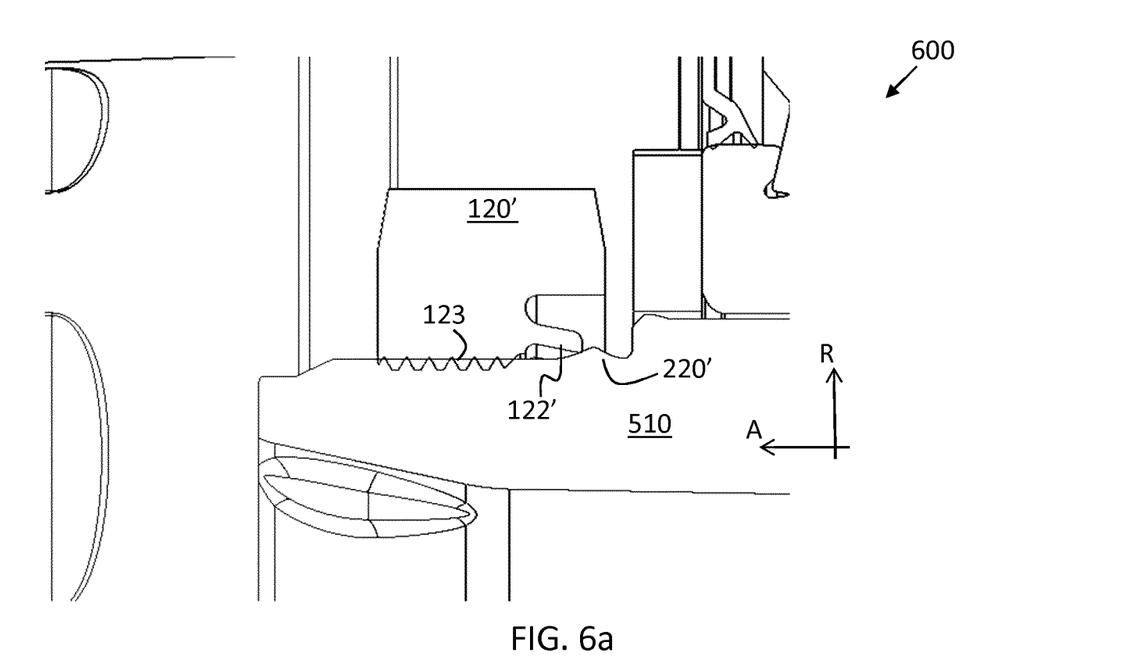
FIGS. 6a,6b show details of an example hub lock nut assembly.
Figure 6B:
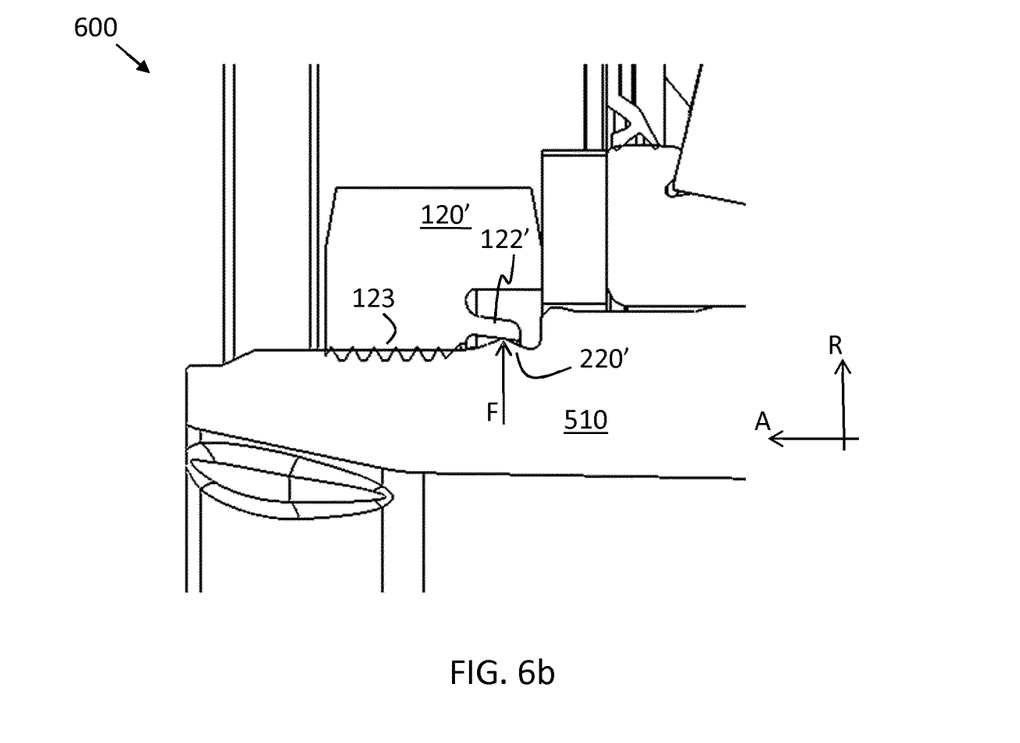

FIGS. 4-6 show a first example of a hub lock nut 120' comprising the resilient portions 122', where the spindle 140' is configured with an annular protrusion 220' that pushes the resilient portions 122' outwards in the radial direction R.

Figure 7A:
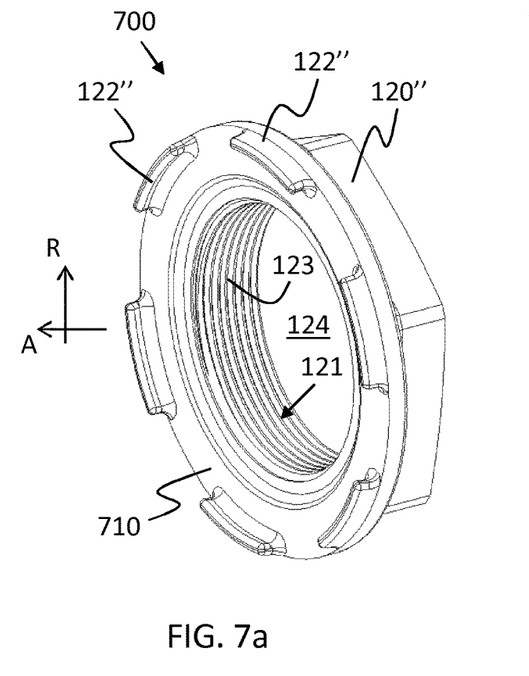
FIGS. 7a, 7b show an example hub lock nut.
Figure 7B:
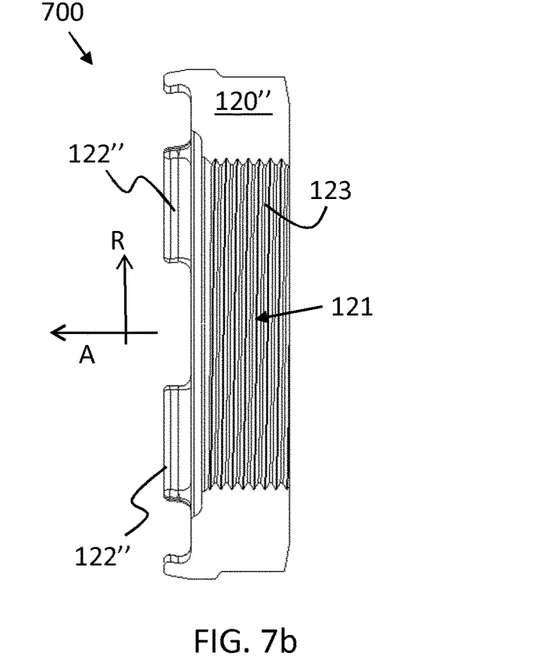
Figure 8A:
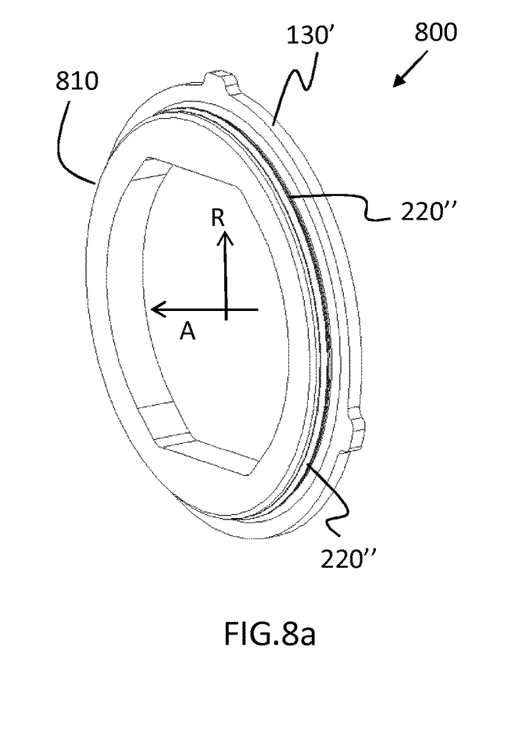
FIGS. 8a, 8b show an example safety washer.
Figure 8B:
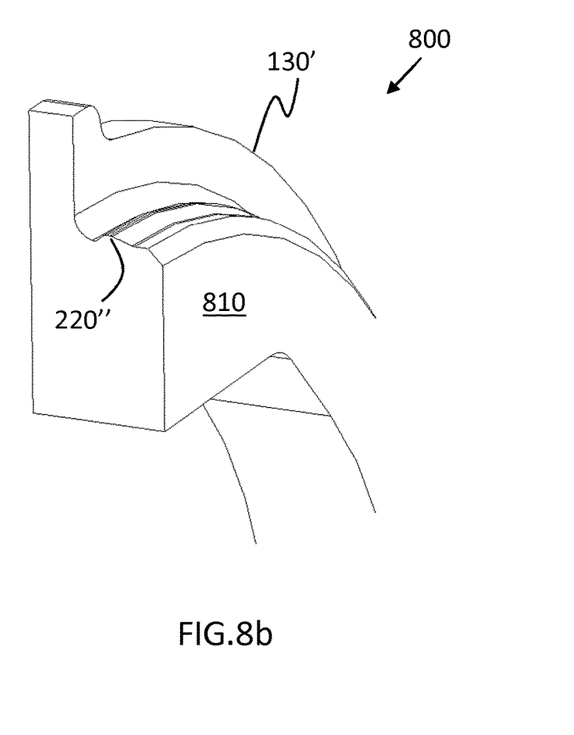
Figure 9A:
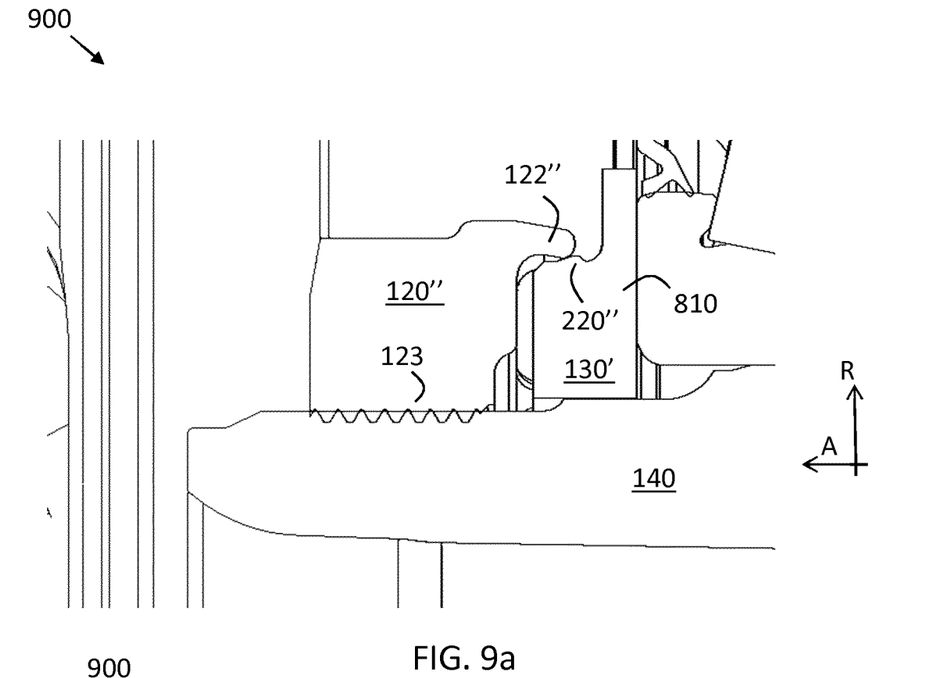
FIGS. 9a,9b show details of an example hub lock nut assembly.
Figure 9B:
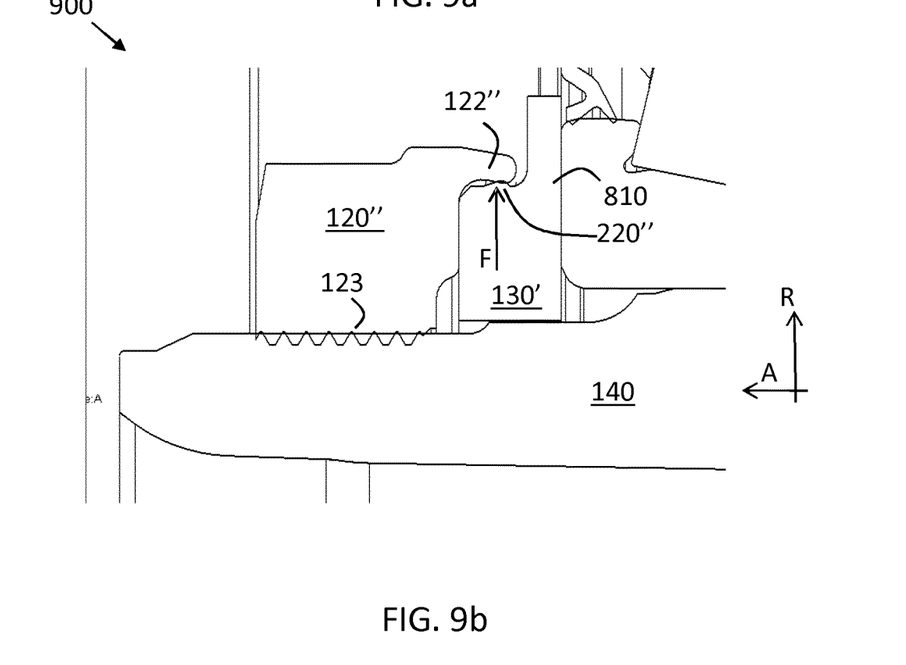

FIGS. 7-9 show a second example of a hub lock nut 120" comprising the resilient portions 122", where the safety washer 130' is configured with an annular protrusion 220" that pushes the resilient portions 122" outwards in the radial direction R.

Generally, there are disclosed herein hub lock nut assemblies 400, 500, 600, 700, 800, 900 for retaining a vehicle wheel hub 110 in position. The hub lock nut assemblies comprise a hub lock nut 120, 120', 120" and a mating component 130, 130', 140, 140' with which the hub lock nut is arranged to be mated in a mated position. The hub lock nut 120, 120', 120" comprises a circumferential inner wall 121 defining a central hole 124. The inner wall 121 has a threaded portion 123. The threaded portion matches a threaded portion on the spindle 140, such that the hub lock nut may hold the wheel hub 110 in position, as illustrated in FIG. 1.

At least one of the hub lock nut or the mating component comprises at least one resilient portion 122, 122', 122" adapted to be movable in a radial direction R outwardly from the central hole 124 when subjected to an external force F provided by the other of the mating component or the hub lock nut. This external force F was exemplified and discussed in connection to FIGS. 2a, 2b, and 3a, 3b above. The force F increases friction to provide the required prevailing torque.

The at least one resilient portion 122, 122', 122" has an engagement area 210, 310 for receiving said external force F. The engagement area 210, 310 is located radially outwardly of the threaded portion 123 in the mated position.

The at least one resilient portion 122, 122', 122" in both the first and the second example are in the form of a snap collar portion located radially of the threaded portion 123 and projecting axially A away from the threaded portion 123. The at least one resilient portion 122, 122', 122" is thus adapted to flex in the radial direction R outwardly from the central hole 124 when subjected to the force F. It is, however, appreciated that other types of resilient portions may be used in the same manner, i.e., the resilient portion need not necessarily be formed as a snap collar portion.

An example where the safety washer or the spindle instead comprises the resilient portions and where the hub lock nut comprises, e.g., a protrusion to engage the resilient portions is not shown in the drawings. However, this 'reverse' configuration follows from the provided examples in a straightforward manner.

FIG. 4 shows a view of the hub lock nut 120 according to the first example. The central hole 124 in the hub lock nut is here further defined by a circumferential non-threaded portion 410. A ledge 420 extends radially outwardly from the threaded portion 123 to the non-threaded portion 410. The resilient portion 122' is connected to said ledge 420 and projects axially A away from the ledge 420.

This particular example shows eight resilient portions 122' arranged evenly around the ledge 420. It is preferred to use an even distribution of resilient portions, i.e., evenly distributed around the ledge 420. However, any number of resilient portions are possible.

It may be advantageous to use resilient portions 122' having a height smaller than the height of the circumferential non-threaded portion 410. This way the resilient portions are somewhat protected by the circumferential non-threaded portion 410 from impact during, e.g., storage.

FIG. 5 shows a view of a spindle 510 constituting the mating component 140' in the first example. The spindle 510 here comprises a protrusion 220' extending radially outwards from the mating component and configured to subject the resilient portion 122' of the hub lock nut 120' to the external force F in the mated position. Note that the thread on the spindle is not shown in FIG. 5. The spindle in FIG. 5 also comprises a flat portion 520 for interfacing with a safety washer 130.

It is noted that the protrusion 220' extends around the whole perimeter of the spindle 510; small gaps could potentially be formed in the protrusion 220', but then the resilient portions 122' could snag onto the protrusion during assembly, which would be a drawback.

FIG. 6a is a cross-sectional view illustrating the hub lock nut 120' being threaded onto the spindle 510 shown in FIG. 5. The resilient portion 122' is just about to climb onto the protrusion 220' arranged annular on the spindle.

FIG. 6b illustrates the hub lock nut 120' and the spindle 510 in or close to the mated position. The resilient portion 122' has now climbed some distance onto the protrusion 220'. The resilient portion therefore now flexes outwards in the radial direction R, and a force F is exerted due to the forced flexing of the resilient portion 122'. This force F provides the required prevailing torque to hold the wheel hub in position. Note especially that the threaded portion 123 is not directly providing the prevailing torque. Therefore, the thread of the hub lock nut and spindle can be designed without any constraints imposed by the prevailing torque function, which is an advantage. Also, since the thread is not part of the prevailing torque function, the arrangement becomes more robust and can be assembled with increased efficiency without worrying as much about damaging the threaded portion 123 on the hub lock nut 120' or the corresponding threaded portion on the spindle 510.

FIGS. 7a and 7b show two different views of the hub lock nut 120" according to the second example. This hub lock nut 120" comprises a flat annular end surface 710 facing in the axial direction A. The at least one resilient portion 122" is located at the radial outer periphery of the annular end surface 710 where it projects in the axial direction A away from the annular end surface 710.

FIGS. 8a and 8b show two different views of a safety washer 810 constituting the mating component 130' in the second example. This safety washer 810 comprises an annular protrusion 220" extending radially R outwards from the safety washer 810, i.e., away from the hole in the safety washer 810. The protrusion 220" is configured to subject the resilient portion 122" of the hub lock nut 120" in FIGS. 7a and 7b to the external force F when in the mated position.

FIG. 9a illustrates the hub lock nut 120" according to the second example being threaded onto a spindle 140. The resilient portion 122" is again just about to climb onto the protrusion 220" which is here arranged annular on the safety washer 810 instead of on the spindle as in the first example. Note that the spindle 140 is not an active component in providing the prevailing torque function, which means that any existing spindle having the right dimensions can be used here.

FIG. 9*b* illustrates the hub lock nut 120″ and the safety washer 810 in or close to the mated position. The resilient portion 122″ has now climbed some distance onto the protrusion 220″. The resilient portion 122″ therefore now flexes outwards in the radial direction R, and a force F is exerted due to the forced flexing. This force F again provides prevailing torque. An advantage associated with the second example compared to the first example is that no modifications to the spindle are necessary. Thus, the technique can be used together with existing spindles, e.g., when servicing the wheel hub 110 or when replacing an existing hub lock nut 120 for some reasons.

According to aspects, with reference to FIGS. 3*a* and 3*b*, the resilient portion 122, 122′, 122″ comprises a distal protrusion 320 extending radially inwards towards the center of the central hole 124 and configured to releasably hold F′ the mating component when in the mated position. This distal protrusion was discussed above in connection to FIGS. 3*a* and 3*b*. The distal protrusion provides increased prevailing torque.

According to aspects, any of the hub lock nut 120, 120′, 120″ and the safety washer 810 is integrally formed by hot-formed steel.

According to aspects, the external force F is configured to provide a prevailing torque of the hub lock nut assembly in dependence of the hub lock nut dimension, wherein the prevailing torque varies between 50 Nm and 230 Nm.

Some example hub lock nut dimensions comprise M42 sized nuts up to M74 sized nuts.

It is appreciated that the different parts of the hub lock nut assemblies are also disclosed herein separately. Thus, there are disclosed herein;

A hub lock nut 120, 120′, 120″ for retaining a vehicle wheel hub 110 in position;

the hub lock nut comprising a circumferential inner wall 121 defining a central hole 124, the inner wall 121 having a threaded portion 123, the hub lock nut comprises at least one resilient portion 122, 122′, 122″ adapted to be movable when subjected to an external force F provided by a mating component with which the hub lock nut is arranged to be mated in a mated position, the at least one resilient portion has an engagement area 210, 310 for receiving said external force F, wherein the engagement area 210, 310 is located radially outwardly R of the threaded portion when the hub lock nut and the mating component is in the mated position.

According to aspects, the at least one resilient portion is in the form of a snap collar portion located radially R of the threaded portion 123 and projecting axially A away from the threaded portion 123, the resilient portion being adapted to flex in the radial direction R when subjected to the force F.

According to aspects, the central hole 124 is further defined by a circumferential non-threaded portion 410, wherein a ledge 420 extends radially outwardly from the threaded portion 123 to the non-threaded portion 410, wherein the resilient portion 122, 122′, 122″ is connected to said ledge 420 and projects from the ledge axially A.

According to aspects, the hub lock nut comprises a flat annular end surface 710 facing in the axial direction A, wherein the resilient portion 122″ is located at the radial outer periphery of the annular end surface 710 and wherein the resilient portion 122″ projects in the axial direction A from the annular end surface 710.

This hub lock nut was exemplified and discussed above in connection to FIGS. 4-9.

A spindle 510 for mating with a hub lock nut 120′ in a mated position to retain a vehicle wheel hub 110 in position was discussed above in connection to FIG. 5. The spindle 510 comprises an annular protrusion 220′ extending radially from the spindle 510, wherein the protrusion 220′ is configured to subject a resilient portion 122′ of the hub lock nut 120′ to an external force F in the mated position, thereby retaining the vehicle wheel hub 110 in position.

A safety washer 810 for mating with a hub lock nut 120″ in a mated position to retain a vehicle wheel hub 110 in position was discussed above in connection to FIGS. 8*a* and 8*b*. The safety washer 810 comprises an annular protrusion 220″ extending radially R outwards from the safety washer 810, wherein the annular protrusion 220″ is configured to subject a resilient portion 122″ of the hub lock nut 120″ to an external force F in the mated position, thereby retaining the vehicle wheel hub 110 in position.

There was also disclosed herein a safety washer for mating with a hub lock nut 120 in a mated position to retain a vehicle wheel hub 110 in position. The safety washer comprises at least one resilient portion adapted to be movable when subjected to an external force F provided by a hub lock nut 120 with which the safety washer is arranged to be mated in a mated position, the at least one resilient portion having an engagement area 210, 310 for receiving said external force F, wherein the engagement area 210, 310 is located radially outwardly R of the safety washer. This particular embodiment of a safety washer was not shown in the drawings but can be realized in a straightforward manner based on the teachings herein.

The invention claimed is:

1. A vehicle wheel hub lock assembly for retaining a vehicle wheel hub in position, the vehicle wheel hub lock assembly comprising:
 a vehicle wheel hub lock nut comprising:
  a circumferential inner wall defining a central hole, the inner wall having a threaded portion; and
  at least one resilient portion; and
 a mating component with which the vehicle wheel hub lock nut is configured to be releasably mated in a mated position, the mating component constituting part of a vehicle spindle, vehicle knuckle, or vehicle wheel axle portion;
 wherein the at least one resilient portion is adapted to be movable in a radial direction outwardly from the central hole when subjected to an external force provided by the mating component, the at least one resilient portion arranged to provide prevailing torque to the vehicle wheel hub lock nut when subjected to the external force, the at least one resilient portion having an engagement area for receiving the external force, wherein the engagement area is located radially outwardly of the threaded portion in the mated position; and
 wherein the mating component comprises a protrusion extending radially outwards from the mating component and configured to subject the resilient portion to the external force in the mated position.

2. The vehicle wheel hub lock assembly of claim 1, wherein the at least one resilient portion is in the form of a snap collar portion located radially of the threaded portion and projecting axially away from the threaded portion, the at least one resilient portion being adapted to flex in the radial direction outwardly from the central hole when subjected to the force.

3. The vehicle wheel hub lock assembly of claim 1, wherein the central hole is further defined by a circumferential non-threaded portion, wherein a ledge extends radially outwardly from the threaded portion to the non-threaded portion, wherein the resilient portion is connected to the ledge and projects axially away from the ledge.

4. The vehicle wheel hub lock assembly of claim 1, wherein the vehicle wheel hub lock nut comprises a flat annular end surface facing in the axial direction, wherein the resilient portion is located at the radial outer periphery of the annular end surface and wherein the resilient portion projects in the axial direction away from the annular end surface.

5. The vehicle wheel hub lock assembly of claim 1, wherein a safety washer constitutes the mating component.

6. The vehicle wheel hub lock assembly of claim 5, wherein the safety washer comprises an annular protrusion extending radially outwards from the safety washer, wherein the protrusion is configured to subject the resilient portion of the vehicle wheel hub lock nut to the external force when in the mated position.

7. The vehicle wheel hub lock assembly of claim 1, wherein at least a portion of the vehicle wheel hub lock nut is integrally formed by hot-formed steel.

8. The vehicle wheel hub lock assembly of claim 1, wherein the external force is configured to provide a prevailing torque of the vehicle wheel hub lock assembly in dependence of the vehicle wheel lock nut dimension, wherein the prevailing torque varies between 50 Nm and 230 Nm.

9. The vehicle wheel hub lock assembly of claim 1, wherein the resilient portion comprises a distal protrusion extending radially inwards towards the center of the central hole and configured to releasably hold the mating component when in the mated position.

10. A vehicle comprising a hub lock assembly comprising:
a hub lock nut comprising:
a circumferential inner wall defining a central hole, the inner wall having a threaded portion; and
at least one resilient portion; and
a mating component with which the hub lock nut is arranged to be mated in a mated position;
wherein the at least one resilient portion is adapted to be movable in a radial direction outwardly from the central hole when subjected to an external force provided by the mating component, the at least one resilient portion arranged to provide prevailing torque to the hub lock nut when subjected to the external force, the at least one resilient portion having an engagement area for receiving the external force, wherein the engagement area is located radially outwardly of the threaded portion in the mated position; and
wherein the mating component comprises a protrusion extending radially outwards from the mating component and configured to subject the resilient portion to the external force in the mated position.

* * * * *